United States Patent
Berghegger

(10) Patent No.: US 7,359,220 B2
(45) Date of Patent: Apr. 15, 2008

(54) CONTROL CIRCUIT FOR CONTROLLING A SWITCH BASED ON A VOLTAGE OF AN AUXILIARY WINDING IN A SWITCHING POWER SUPPLY

(75) Inventor: Ralf Schröder Gen. Berghegger, Glandorf (DE)

(73) Assignee: FRIWO Mobile Power GmbH, Ostbevern (DE)

( * ) Notice: Subject to any disclaimer, the term of this patent is extended or adjusted under 35 U.S.C. 154(b) by 73 days.

(21) Appl. No.: 11/368,723

(22) Filed: Mar. 6, 2006

(65) Prior Publication Data

US 2006/0208969 A1   Sep. 21, 2006

(30) Foreign Application Priority Data

Mar. 11, 2005  (DE) ............... 10 2005 011 396
May 18, 2005  (DE) ............... 10 2005 022 859

(51) Int. Cl.
*H02M 3/335*   (2006.01)
(52) U.S. Cl. ............... 363/21.08; 363/21.16; 363/97
(58) Field of Classification Search ......... 363/21.08, 363/21.16, 97
See application file for complete search history.

(56) References Cited

U.S. PATENT DOCUMENTS

| | | | | |
|---|---|---|---|---|
| 3,742,371 | A * | 6/1973 | Seibt et al. ............ | 363/18 |
| 4,858,052 | A * | 8/1989 | McDonnal ............. | 361/18 |
| 4,975,823 | A * | 12/1990 | Rilly et al. ............ | 363/21.16 |
| 5,438,499 | A | 8/1995 | Bonte et al. | |
| 5,656,965 | A | 8/1997 | Nelson et al. | |
| 5,689,407 | A * | 11/1997 | Marinus et al. ........ | 363/21.15 |
| 5,815,015 | A | 9/1998 | Nelson et al. | |
| 5,936,852 | A * | 8/1999 | Weinmeier et al. .... | 363/21.15 |
| 6,922,345 | B2 * | 7/2005 | Nishida et al. ........ | 363/21.16 |
| 7,035,122 | B2 * | 4/2006 | Kim et al. ............. | 363/21.18 |
| 7,061,780 | B2 * | 6/2006 | Yang et al. ............ | 363/21.16 |
| 7,102,899 | B2 * | 9/2006 | Reinhard et al. ...... | 363/21.01 |

FOREIGN PATENT DOCUMENTS

DE   21 67 212   * 9/1971

(Continued)

*Primary Examiner*—Jeffrey Sterrett
(74) *Attorney, Agent, or Firm*—Michael Best & Friedrich LLP

(57) ABSTRACT

The present invention refers to a control circuit and an associated method of controlling the output voltage of a primarily controlled power switching supply with a primary-sided switch and a transformer with an auxiliary winding, in which after opening the primary-sided switch an auxiliary voltage for indicating the output voltage is induced. The induced voltage is supplied to a control circuit as control variable. In order to provide a control circuit, which needs as few external components as possible, which can be manufactured at low cost and which has a possibly low need of space, a driver output of the control circuit is connected to a control input of the primary-sided switch and the control circuit is adapted such that it adjusts the switching frequency of the primary-sided switch depending on the auxiliary voltage, wherein a constant factor of this dependency is selected such that the output current of the switching power supply adopts a predetermined value, and wherein the driver output is further connected to the input of a comparator for determining the current through the primary-sided switch.

19 Claims, 6 Drawing Sheets

FOREIGN PATENT DOCUMENTS

| | | |
|---|---|---|
| DE | 197 11 771 | 10/1998 |
| DE | 103 10 361 | 9/2004 |
| DE | 10 2004 016 927 | 11/2005 |
| EP | 1 146 630 | 10/2001 |
| EP | 1 499 005 | 1/2005 |
| GB | 1 349 870 | * 11/1984 |
| WO | WO 95/09476 | 4/1995 |

* cited by examiner

CONTROL CIRCUIT FOR CONTROLLING A SWITCH BASED ON A VOLTAGE OF AN AUXILIARY WINDING IN A SWITCHING POWER SUPPLY

BACKGROUND OF THE INVENTION

1. Field of the Invention

The present invention refers to a control circuit and an associated method of controlling the output voltage of a primarily controlled switching power supply. The switching power supply comprises a primary-sided switch and a transformer with an auxiliary winding, in which after opening the primary-sided switch an auxiliary voltage reflecting the output voltage is induced. The voltage induced in the auxiliary winding is supplied to a control circuit as control variable. The present invention further refers to an associated switching power supply.

2. Description of the Related Art

Usually, known switching power supplies use a power transistor as a switch to supply a pulsed current flow to a network of inductive and capacitive energy storage elements which convert the switched current pulses into a controlled direct voltage. Switching power supplies may supply output voltages that are greater, equal to or of opposite polarity as the uncontrolled input voltage, depending on the operating mode of the switching power supply. Switching power supplies are often used in power supply circuits. It is particularly desirable that such a switching power supply accepts input voltages in the range of 85 V alternating voltage to 270 V alternating voltage and thus may operate with different network supplies all over the world without modifications or switches.

The output voltage of such a switching power supply is usually controlled by means of a feedback signal which reflects the output voltage. This feedback signal is used to control the working cycle of the switching power transistor. There are different approaches to provide a suitable feedback signal. An auxiliary winding may for instance be provided, which during the switch-off time of the primary switch generates a feedback signal which supplies a reflection of the output voltage.

Switching power supplies of this type with auxiliary windings are for instance shown in the German Patent application DE 103 10 361, the European patent application EP 03 016 065.9, the U.S. Pat. No. 5,438,499 or the German laying-open specification DE 197 11 771 A1. The signal generated in the auxiliary winding is supplied to a feedback circuit which supplies the control signal to the control circuit.

In the case of a switching power supply operating according to the blocking converter type, in which the transmitted energy per pulse is equal and the duration of the breaks between the pulses is adjustable, as is shown in EP 03 016 065.9, the output voltage may very well be reflected and controlled with the primary auxiliary voltage.

In the above-mentioned switching power supplies the problem occurs that the output current can be detected in a very laborious way only. The power flow time of the secondary winding of the converter can for instance be determined, as shown in DE 103 10 361. As an alternative, an opto-coupler may be used, as it is for instance shown in the European patent application EP 1 146 630 A2.

In order to adjust the output voltage and the output current in a possibly simple and cost-effective manner and at the same time to minimize the component costs necessary for this purpose, a method is therefore suggested according to the German patent application DE 10 2004 016 927.6 in which the switching frequency of the primary-sided switch is adjusted depending on the auxiliary voltage in a manner that the output voltage and the output current of the switching power supply adopt values according to a predetermined output characteristics. This is based on the fact that in the case of a known output voltage the power required for a predetermined output current can be calculated according to the following equation $$P = \frac{U_{out} \cdot I_{out}}{\eta} \quad (1)$$

wherein P means the output power, $U_{out}$ means the output voltage, $I_{out}$ means the output current and $\eta$ means the efficiency. Furthermore, the following connection formulated in the following equation 2 applies for the switching frequency f to be adjusted:

$$f = \frac{P}{W} \quad (2)$$

with $$W = \frac{L_{prim} \cdot I_{prim,max}^2}{2},$$

wherein $L_{prim}$ designates the primary-sided inductivity and $I_{prim,max}$ designates the maximal primary-sided current.

If equation (1) is inserted into equation (2), the following results:

$$f = U_{out} \cdot I_{out} \cdot \frac{1}{\eta \cdot W} \quad (3)$$

$$= const.$$

However, this means that in the case of constant and known efficiency $\eta$ the product of output voltage $U_{out}$ and output current $I_{out}$ linearly depends on the frequency f. Thus, the required switching frequency can directly be determined from the output voltage $U_{out}$ fed back via the auxiliary voltage for a predetermined output current $I_{out}$. The advantage of the solution shown in DE 10 2004 016 927.6 is that laborious component-intensive measuring methods for determining the output current do no longer have to be provided. However, a component with five external terminals and the external components $C_t$ and $R_t$ are still required for the control circuit shown in this reference. An additional input is required for the detection of the current by the primary-sided switch. This increases the costs, the complexity and also the required space for the control circuit.

SUMMARY OF THE INVENTION

Thus, it is the object of the present invention to provide a control circuit for controlling the output voltage of a primarily controlled switching power supply which operates with as few components as possible, which can be manufactured at low cost and which needs as few space as possible.

This object is solved by the subject matter of the independent claims. Advantageous developments of the present invention are subject matter of the dependent claims.

The present invention is based on the idea that by using already existing internal signals on the one hand and by integrating formerly external components into the ASIC (applicant specific integrated circuit) on the one hand, the control circuit can be accommodated in a housing with three terminals only. This has the advantage of a small need of space for external components and the more cost-effective housing for the control circuit. The entire circuit therefore needs significantly less space than the known solutions.

According to the present invention, the terminal for the driver output and the input for the current measuring signal, which are separated in the known solutions, are combined. This is possible since as soon as the driver switches on the external transistor, i.e. the primary-sided switch, the sum of the voltage at the base emitter path of the external transistor and the voltage at the current measuring resistor applies at the control output. In the known solution the voltage is detected at the current measuring resistor at a separate input to measure the current flowing through the primary-sided switch. Since, however, the voltage at the base emitter path of the external transistor is almost constant with approximately 0.7 V, the voltage for measuring the current applying at the diver output can instead also be used, since with an offset of the mentioned 0.7 V it reflects the voltage at the current measuring resistor.

If the driver switches high resistively at the primary-sided switch when reaching a switching threshold lower than the switch-off threshold, e.g. at 80% of the switch-off threshold plus the base emitter voltage, and further comprises an integrated base-emitter resistance, the voltage, which is caused by the base-emitter diode, can advantageously be minimized, which reduces the measuring tolerance.

According to an advantageous development of the present invention, the control circuit comprises an integrated charging capacitor, which can be charged depending on the auxiliary voltage. The switching frequency is adjusted linearly depending on the auxiliary voltage in that it is determined by the charging time of the charging capacitor. The charging capacitor is charged by a current proportional to the auxiliary voltage up to a predetermined voltage threshold. The charging time of the charging capacitor then determines the time at which the switch is switched on. According to the invention this charging capacitor is integrated in the control circuit so that an external component is not required and the number of the required external terminals can further be reduced.

The charging current proportional to the auxiliary voltage may be provided by a controllable current source and be fed into the charging capacitor. This charging current source is also provided in an integrated manner in the component.

Furthermore, a resistor may be provided for adjusting the charging current between a first and a second input terminal of the charging current source, said resistor being integrated according to the invention in the control circuit. Thus, a further terminal is saved and the circuit can be manufactured with less external components and a more cost effective housing.

When designing the charging current source such that it reduces the charging current when the auxiliary voltage reaches a predetermined threshold value well-defined, output characteristics can be achieved by the present control circuit, said output characteristics ensuring for output voltages below a voltage range of 12 V approximately constant current values. Particularly, so-called fold-back characteristics can be achieved.

According to an advantageous development of the present invention, the voltage dropping at the charging capacitor is monitored and a control comparator outputs a switch-on signal for switching on the primary-sided switch if the voltage dropping at the charging capacitor reaches a first threshold value. In order to realize an overvoltage protection circuit, it may be provided that the primary-sided switch is switched off if the voltage dropping at the charging capacitor reaches a second threshold value.

According to the present invention, the current limitation as well as the voltage control is implemented through a variation of the switching frequency. Thus, it is possible to keep the primary peak current constant. This improves the voltage control in the case of a control depending on the primary auxiliary voltage, since the effects caused by parasitic elements in each pulse are identical and can thus be eliminated by simple measures. Furthermore, the charging capacitor is charged with a current, which is proportional to the auxiliary voltage and this voltage is proportional to the output voltage. The capacitor according to the present invention is charged very quickly so that advantageously the discharge hardly has any influence on the frequency. Thus, the period duration, i.e. the reciprocal value of the switching frequency, is proportional to the output voltage.

The advantageous properties of the control circuit according to the present invention have a special effect in a primarily controlled switching power supply.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention is illustrated in the accompanying drawings, wherein.

DETAILED DESCRIPTION OF THE INVENTION

The illustrated embodiments of the present invention will be described with reference to the figure drawings wherein like elements and structures are indicated by like reference numbers.

Figure 1:
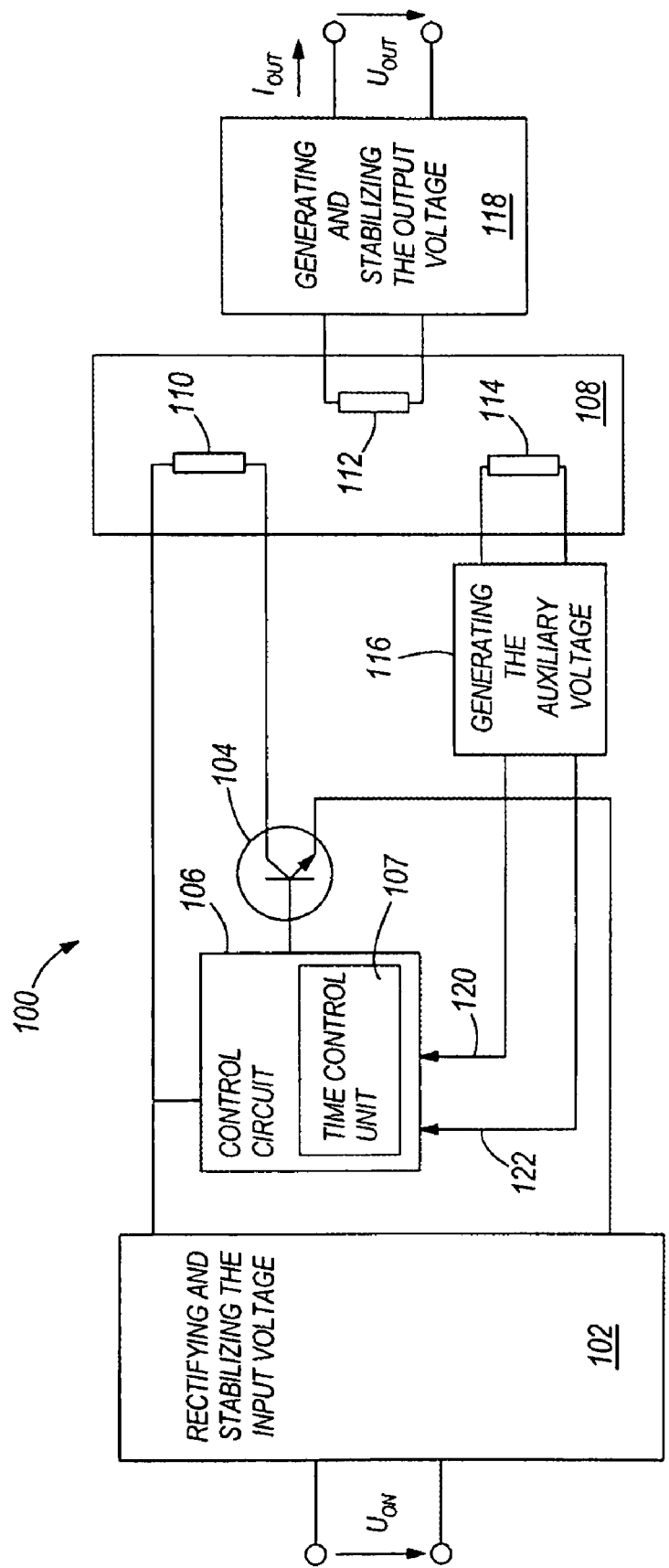
FIG. 1 shows a principle illustration of a primarily controlled switching power supply according to the present invention.

Referring now to the Figures and in particular to FIG. 1, a block diagram of a switching power supply with a control circuit 100 is shown. The switching power supply is biased on its input with the alternating voltage $V_{net}$. In Europe the mains voltage varies between an alternating voltage of 180 V and 264 V, in America it varies between an alternating voltage of 90 V and 130 V. In block 102 the input voltage is amplified and stabilized. Above that it is ensured that interfering signals, which are generated in the switching power supply, do not get back into the alternating voltage net. The primary-sided winding 110 of the insulated transformer 108 and the primary-sided switch 104, which in this case is a power transistor, form a series circuit, which is connected with the rectified input voltage. The primary-sided switch 104 interrupts the current that flows through the primary-sided winding 110, according to the control signal of the control circuit 106.

The switching pulses supplied by the control circuit 106 to the control input of the primary-sided switch 104 are controlled by the block 116 in which the control variable is generated by means of an auxiliary winding 114 of the transformer 108. The two signal paths 120 and 122 designate two substantial functions. On the one hand, the signal 120 supplies the control circuit 106 with sufficient energy, on the other hand, the signal path 122 controls the control circuit 106 in a manner that changes in the switching cycle negatively affect the electric power that is supplied to the transformer 108. In the switching power supply according to the invention, the control circuit 106 includes a time control unit 107, which ensures that the break times (or also switch-off times) in which the primary-sided switch 104 is opened, are adapted in their length to the required power. The energy that is supplied into the transformer 108 during each switch-on phase of the primary-sided switch remains equal.

The secondary-sided winding 112 of the transformer is, as may be seen from FIG. 1, connected to a block 118, which generates and possibly stabilizes the secondary-sided voltage $U_{out}$.

The control circuit 106 controls the primary-sided switch 104 in a manner that it is alternatingly brought into the conductive and non-conductive state. Due to the voltage supplied by the block 102 a current flows into the primary-sided winding 110 every time the primary-sided switch 104 is in the conductive state. A change of the current supplies energy into the magnetic field of the transformer 108. If the primary-sided switch 104 blocks, the energy stored in the magnetic field mainly discharges through the secondary-sided winding 112 and into the block 118, which generates and stabilizes the secondary voltage. A small part of the energy is also discharged into the auxiliary winding 114 and into block 116. This block generates an auxiliary voltage as control variable. The energy discharges periodically, but by rectification and filtering a substantially rectified voltage can be generated as auxiliary voltage. Since the magnetic coupling between the different windings of the transformer is constant and does not depend on the values of the current or the voltage, the value of the auxiliary voltage is proportional to the value of the secondary voltage and is thus proportional to the value of the output voltage.

By means of the time control unit 107 the switch-off duration of the primary-sided switch 104 can be adjusted such that the energy supplied into the transformer depends on the output voltage. Thus, the transmitted power is adjusted such that a desired value results for the output voltage $U_{out}$.

As suggested in DE 10 2004 016 927.6, the value of the voltage $U_{out}$ is controlled such that a constant and predetermined value results for the output current $I_{out}$.

Figure 2:
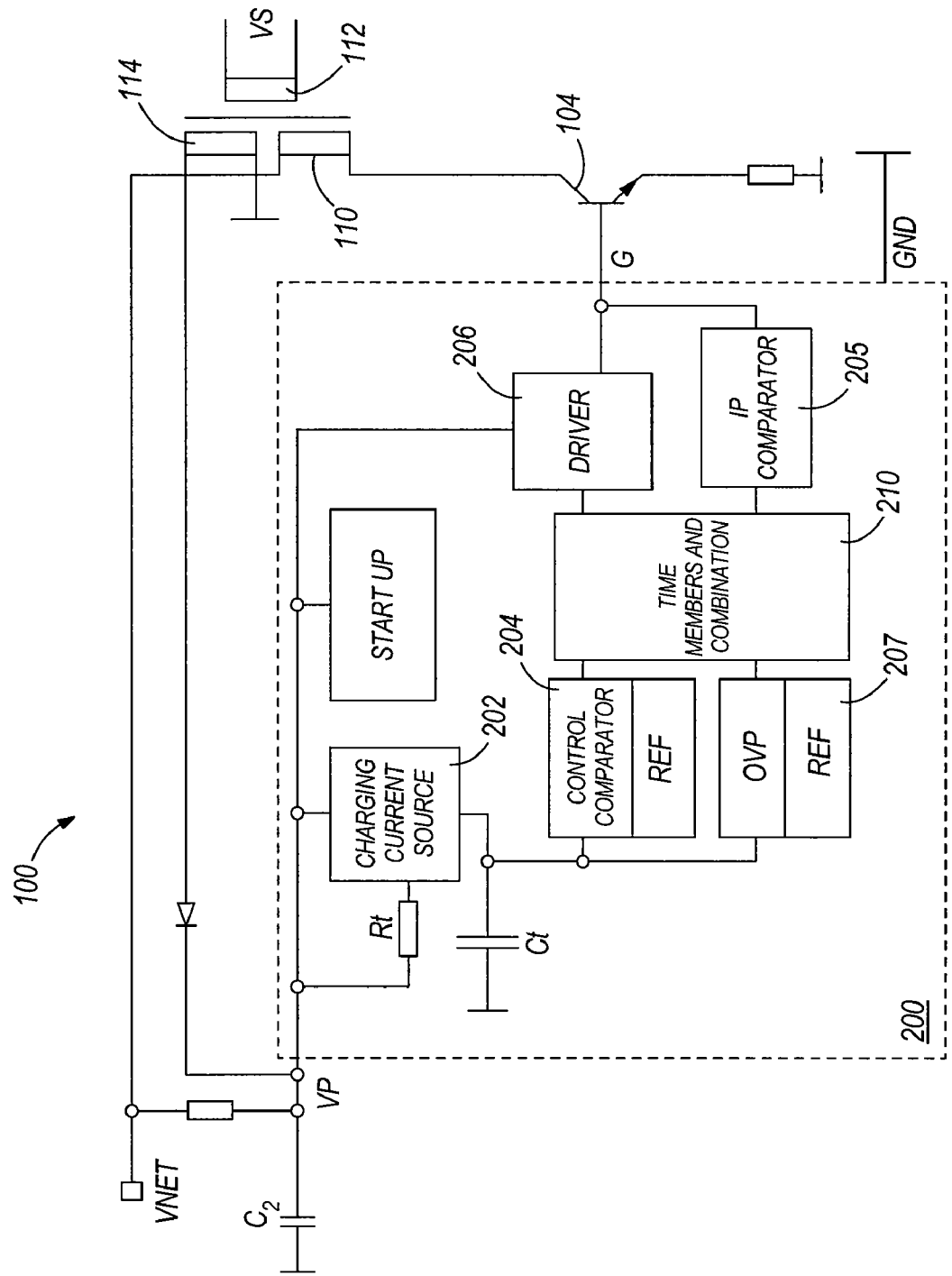
FIG. 2 shows a block diagram of a control circuit according to the present invention in its application environment.

FIG. 2 shows the control circuit 200 according to the present invention for controlling the output power of a primarily controlled switching power supply in its application environment. Such a control circuit may e.g. be designed as an application-specific integrated circuit (ASIC). Of course, a specially designed circuit is also possible. By the aid of the control circuit 200 the secondary power of the switching power supply 100 output at the secondary winding 112 is controlled in a primary-sided manner by controlling the electronic switch 104, in this case a power bipolar transistor. As a control variable the voltage at the auxiliary winding 114 is used.

According to the present invention, the control circuit 200 is designed such that only a total of three terminals (VP, G, GND) are guided towards the outside. The charging capacitor $C_t$ and resistor $R_t$ are integrated in the control circuit 200. The terminals VP and GND remain unchanged, but the terminal IP, which is provided externally in the known solutions and which is connected to the emitter terminal of the primary-sided switch 104, is internally connected to the driver output G. This is possible since if the driver 206 switches on the external transistor 104, the sum of the voltages at the base emitter path of the transistor 104 and the voltage at the current measuring resistor $R_m$ applies at terminal G. The voltage at the current measuring resistor represents the voltage that is required by the IP comparator 205 for detecting the current through the primary-sided switch 104. Since, however, the voltage at the base emitter path remains constant with approx. 0.7 V, it may be regarded as an offset and instead of the voltage at the current measuring resistor, the voltage at the driver output G can be detected.

To reduce the tolerances, it is useful to increase the reference voltage for the primary power detection so that the base emitter voltage of the external transistor 104 has a possibly small influence.

The function of the circuit according the invention shall now be explained in more detail, which substantially corresponds to the function of the circuit according to DE 10 2004 016 927.

Figure 3:
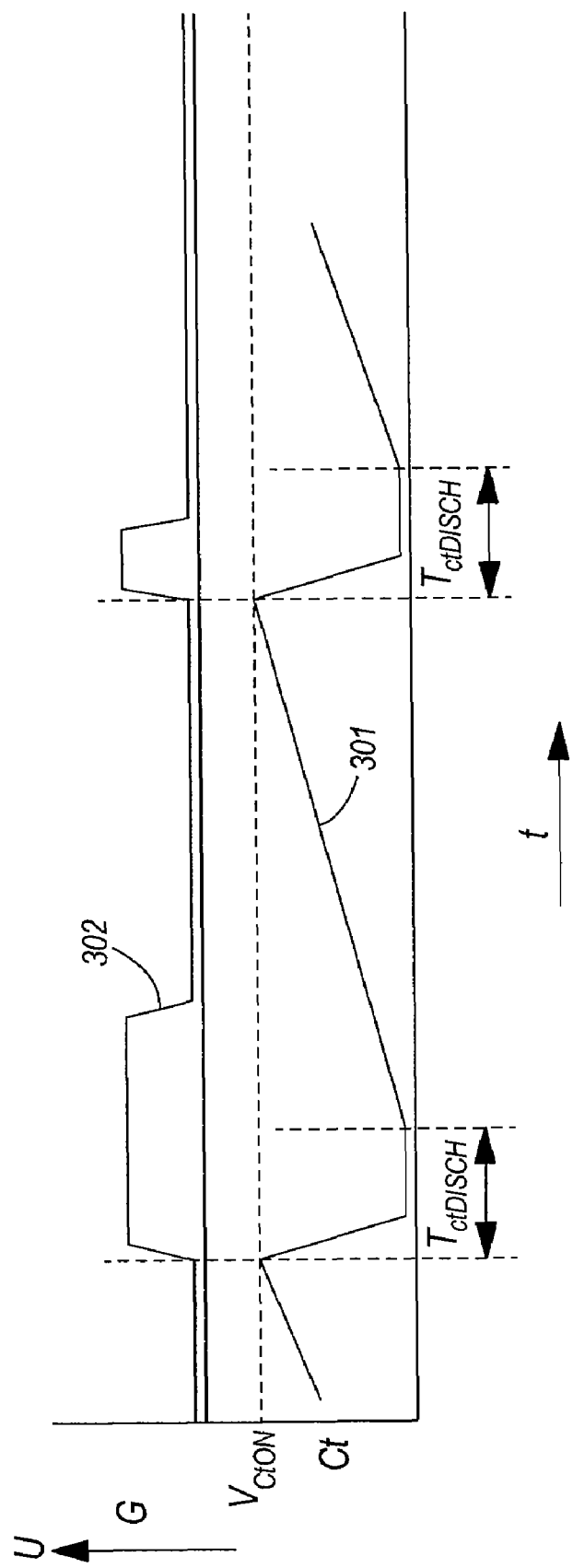
FIG. 3 shows a time diagram of the voltages at the charging capacitor and at the driver output according to FIG. 1.

If the uprising supply voltage at the terminal VP has reached the so-called start-up voltage, the control voltage 200 is activated and starts charging the capacitor $C_t$ by means of the charging current source 202. In FIG. 3 the curve 301 designates the voltage course at the capacitor $C_t$ depending on the time. The curve 302 shows the associated driver signal at the terminal G. The discharge of the capacitor $C_t$ can be characterized by the discharge time $T_{CtDISCH}$. For a capacity of 100 pF the discharge time is for instance between 250 and 100 ns for the present voltage.

As may be seen from FIG. 3, the capacitor $C_t$ is discharged until the voltage dropping there reaches the first threshold value $C_{ton}$. Then, the driver switches on. After exceeding the threshold $V_{IP}$ at the IP comparator 205, which by an external resistor determines the current through the primary coil of the transmitter, the driver is switched off again. Then, the capacitor $C_t$ is discharged. After expiry of the time $T_{CtDISCH}$ the capacitor $C_t$ is charged again. This process repeats periodically, until the switching power supply is switched off by a safety function or by separation from the net.

Figure 4:
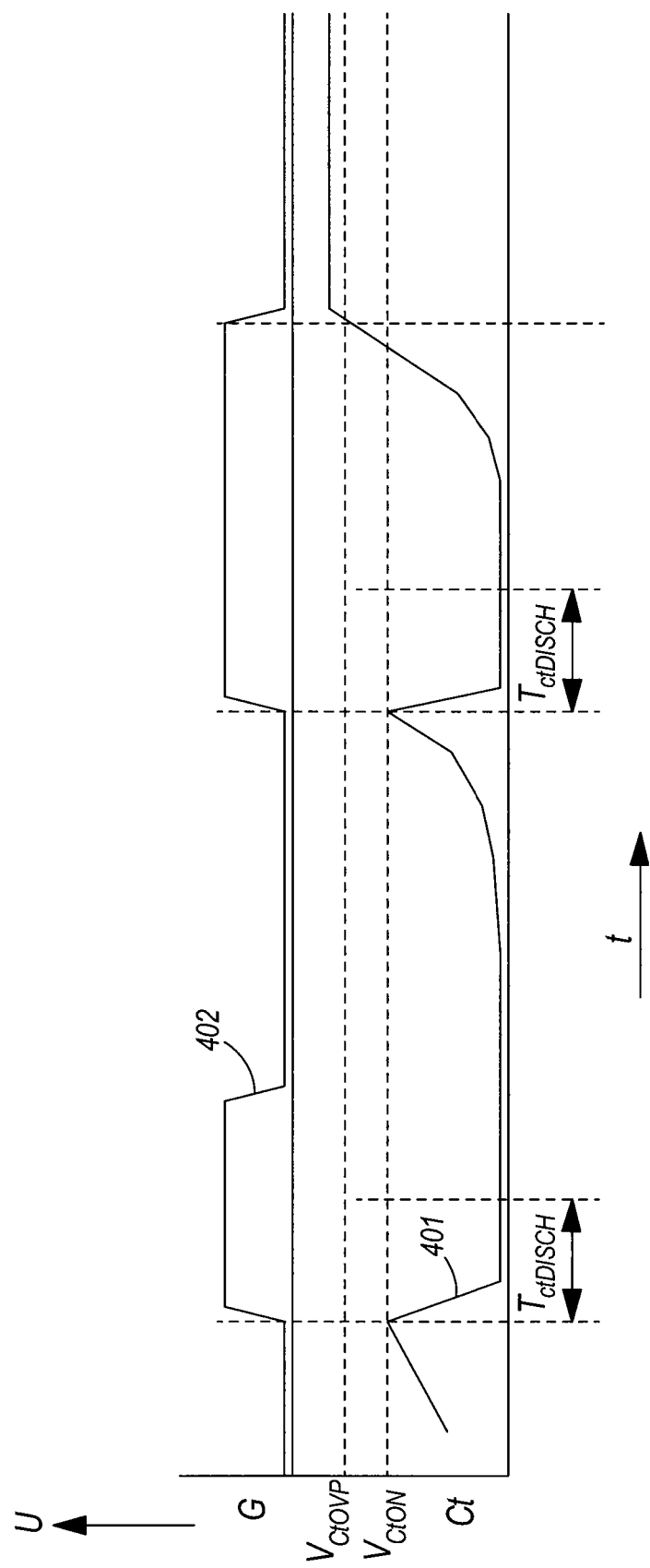
FIG. 4 shows the chronological sequence of the voltages at the charging capacitor and at the driver output for explaining the overvoltage protection.

Besides this normal operating function, safety circuits are provided, which shall prevent undesired operating states. The OVP comparator 207 switches off the driver in the case of high voltages at the auxiliary winding, i.e. voltages above the threshold $V_{CtOVP}$ (see FIG. 4) and prevents the new switch-on.

Before the so-called start-up, the control circuit is supplied directly from the mains voltage. During operation, the circuit is supplied by the auxiliary winding 114.

The driver 206 includes a push-pull stage with VP as supply voltage and provides the control power for the external power bipolar transistor 104.

Figure 5:
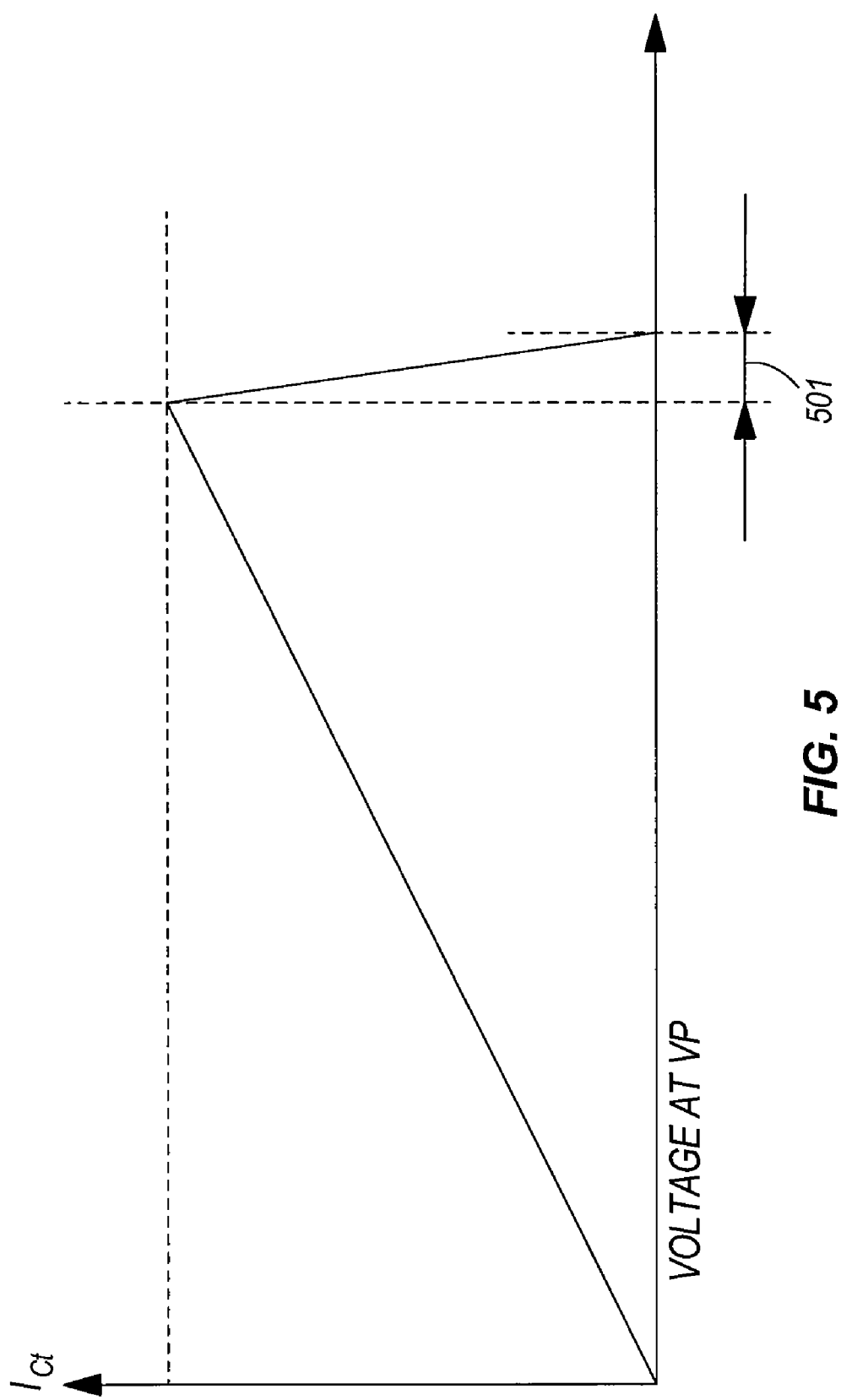
FIG. 5 shows a schematical view of the dependency between the auxiliary voltage and the charging current of the charging capacitor.

FIG. 5 shows the variation in time of the charging current $I_{CT}$ according to the invention depending on the voltage applied at the terminal VP. The actual control is implemented by a transmission of the secondary voltage to the auxiliary voltage during the blocking phase and the integration of this voltage at the capacitor C2 at VP. The secondary output voltage is determined by the transmission ratio between the secondary winding and the auxiliary winding. As already mentioned, the break time is controlled such that the voltage at VP lies within the control range 501. If the voltage is lower than the control range 501, a current control takes place, at which the charging current at the capacitor $C_t$ is proportional to the voltage VP. If the voltage at VP reaches the control range 501, the charging current is reduced.

Figure 6:
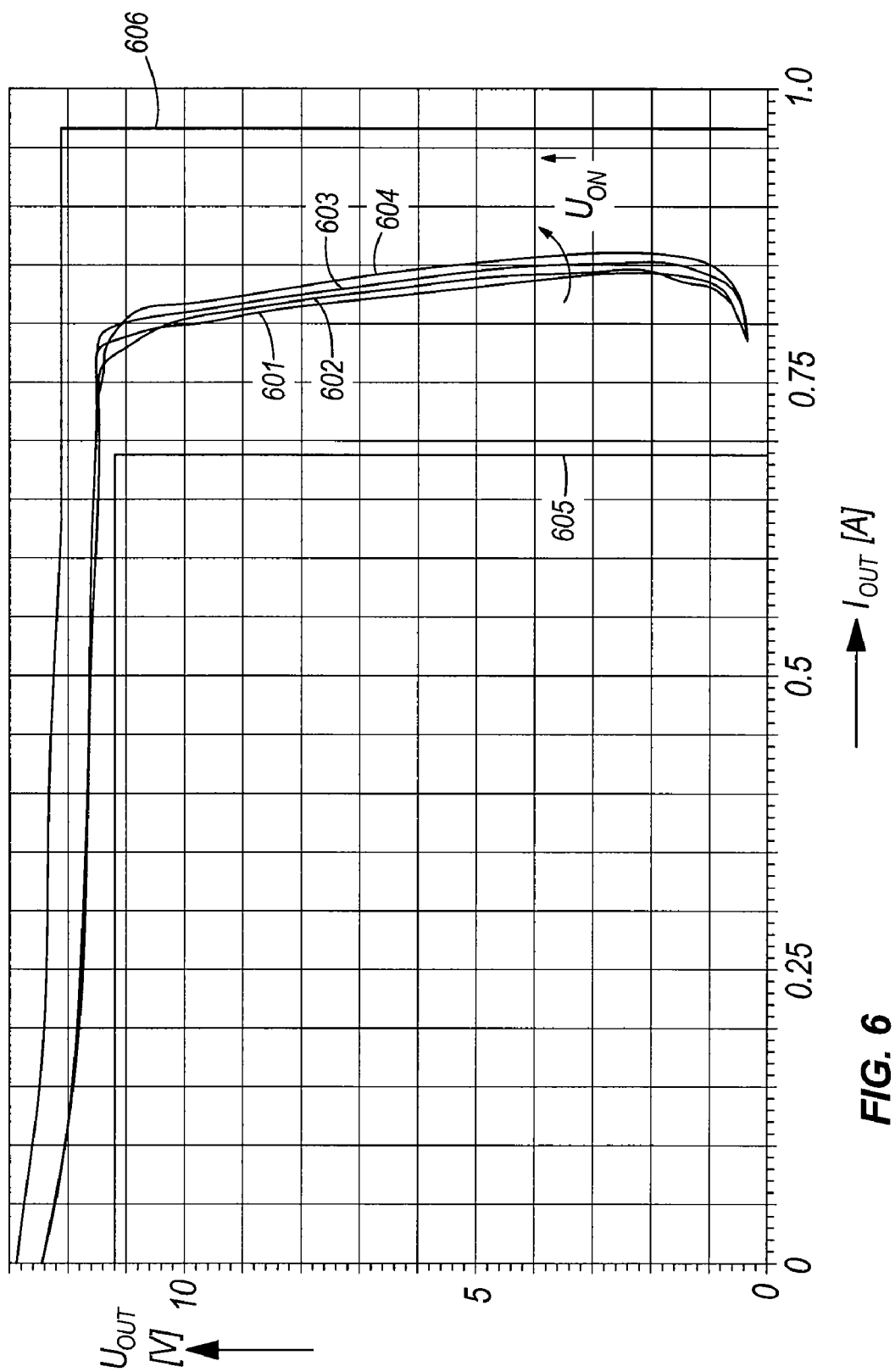
FIG. 6 shows the output characteristics of a switching power supply according to the present invention.

Thus, output characteristics, as shown in FIG. 6, can be realized by the switching power supply according to the invention. The curves 601, 602, 603 and 604 refer to the input voltages of 90 V, 110 V, 230 V and 264 V alternating voltage. As may be seen from the illustration, output characteristics can be achieved by the control circuit according to the invention, which ensures approximately constant current values $I_{OUT}$ for output voltages below a voltage range of 12 Volt. This voltage range may, however, also be adapted in any manner to the respective demands by a respective adaptation of the winding numbers of the primary-sided winding 114 and the secondary-sided winding 112.

The line 605 designates in FIG. 6 the minimally allowable output voltage values and output current values, and the curve 606 designates the maximally allowable courses.

Although a linear connection between the output voltage $U_{OUT}$ and the output current $I_{OUT}$ was described above by way of an example, it is clear to the person skilled in the art that any other output characteristics can also be defined. For this purpose the curve form of FIG. 5 must be adjusted accordingly.

The control circuit according to DE 10 2004 016 927, however, requires a total of six terminals as well as several external components. By the solution according to the invention, a control circuit, which ensures both output current limitation and output voltage limitation and which ensures an overvoltage protection, can be realized by an IC, which requires only three outwardly directed terminals, and in which the number of the required external components is reduced. The advantage is on the one hand the smaller need of space of external components and on the other hand the more cost-effective housing of the control circuit and the smaller need of space of the entire circuit.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

In addition, those areas in which it is believed that those ordinary skilled in the art are familiar have not been described herein in order to not unnecessarily obscure the invention described herein. Accordingly, it is to be understood that the invention is not to be limited by the specific illustrated embodiments, but only by the scope of the appended claims.

What is claimed is:

1. Control circuit for controlling the output voltage of a primarily controlled switching power supply, wherein the switching power supply comprises a primary-sided switch and a transformer with an auxiliary winding, in which after opening the primary-sided switch an auxiliary voltage is induced, wherein a driver output of a driver of the control circuit is connected to a control input of the primary-sided switch and the control circuit is designed such that it adjusts the switching frequency of the primary-sided switch depending on the auxiliary voltage, wherein a constant factor of this dependency is chosen such that the output current of the switching power supply adopts a predetermined value, and wherein the driver output is further directly coupled to the input of a comparator for determining the current through the primary-sided switch.

2. Control circuit as claimed in claim 1, wherein an output of a driver, which generates the control signal, obtains a high resistance when reaching a threshold lower than the switch-off threshold.

3. Control circuit as claimed in claim 2, wherein the lower threshold is 80% of the switch-off threshold.

4. Control circuit as claimed in claim 1, which further comprises an integrated charging capacitor, which can be charged depending on the auxiliary voltage, wherein the charging capacitor is connected with the primary-sided switch in a manner that the voltage dropping at the charging capacitor controls the switching frequency of the primary-sided switch.

5. Control circuit as claimed in claim 4, which further comprises an integrated charging current source which comprises a charging current for charging the charging capacitor depending on the auxiliary voltage.

6. Control circuit as claimed in claim 5, wherein a resistor for adjusting the charging current is provided between a first and a second input terminal of the charging current source, and wherein this resistor is integrated in the control circuit.

7. Control circuit as claimed in claim 5, wherein the charging current source is formed such that it reduces the charging current if the auxiliary voltage reaches a predetermined limit value.

8. Control circuit as claimed in claim 5, wherein the control circuit comprises a control comparator for comparing the voltage dropping at the charging capacitor with a first threshold value, and the control comparator is adapted such that it generates an input signal for putting in the primary-sided switch when the voltage dropping at the charging capacitor reaches the first threshold value.

9. Control circuit as claimed in claim 4, wherein an overvoltage protection circuit for comparing the voltage dropping at the charging capacitor is provided with a second threshold value, which is formed such that it generates a switch-off signal for switching off the primary-sided switch when the voltage dropping at the charging capacitor reaches the second threshold value.

10. Switching power supply a primary-sided switch and a transformer with an auxiliary winding, in which after opening the primary-sided switch an auxiliary voltage is induced, further comprising a control circuit for controlling the output voltage of said switching power supply, wherein a driver output of a driver of the control circuit is connected to a control input of the primary-sided switch and the control circuit is designed such that it adjusts the switching frequency of the primary-sided switch depending on the auxiliary voltage, wherein a constant factor of this dependency is chosen such that the output current of the switching power supply adopts a predetermined value, and wherein the driver output is further directly coupled to the input of a comparator for determining the current through the primary-sided switch.

11. Method of controlling the output voltage of a primarily controlled switching power supply, wherein the power switching supply comprises a primary-sided switch and a transformer with an auxiliary winding, in which after opening the primary switch an auxiliary voltage for reflecting an output voltage is induced, wherein by applying a control signal to the primary-sided switch the switching frequency of the primary-sided switch is adjusted depending on the auxiliary voltage in a manner that the output voltage and the output current of the switching power supply adopt values according to predetermined output characteristics, and wherein the control signal is further directly coupled to a comparator and wherein the current through the primary-sided switch is determined by evaluating said control signal.

12. Method as claimed in claim 11, wherein an output of a driver, which generates the control signal, obtains a high resistance when reaching a threshold lower than a switch-off threshold.

13. Method as claimed in claim 12, wherein the lower threshold is 80% of the switch-off threshold.

14. Method as claimed in claim 11, wherein the switching frequency of the primary-sided switch is adjusted at least for a part of the values of the auxiliary voltage in linear dependency of the auxiliary voltage, wherein a constant factor of this linear dependency is selected such that the output current adopts a predetermined constant value.

15. Method as claimed in claim 14, wherein the charging time of a charging capacitor, which can be charged depending on the auxiliary voltage, determines the switching frequency of the primary-sided switch.

16. Method as claimed in claim 15, wherein the charging capacitor is charged by a current source, whose charging current can be adjusted by the auxiliary voltage.

17. Method as claimed in claim 16, wherein the charging current is reduced when the auxiliary voltage reaches a predetermined limit value.

18. Method as claimed in claim 15, characterized in that the primary-sided switch is switched on when the voltage dropping at the charging capacitor reaches a first predetermined threshold value.

19. Method as claimed in claim 15, characterized in that the primary-sided switch is switched off when the voltage dropping at the charging capacitor reaches a second threshold value.

* * * * *